(12) United States Patent
Duerig et al.

(10) Patent No.: US 6,791,433 B1
(45) Date of Patent: Sep. 14, 2004

(54) SIGNAL PROCESSING BY MEANS OF RESONATORS

(75) Inventors: Urs Duerig, Rueschlikon (CH); Peter Bloechl, Adliswil (CH); Oliver Folini, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 09/616,020

(22) Filed: Jul. 13, 2000

(30) Foreign Application Priority Data

Jul. 14, 1999 (EP) .............................................. 99113750

(51) Int. Cl.[7] .......................... H03H 7/46; H04R 25/00
(52) U.S. Cl. .................... 333/132; 333/133; 333/20; 333/28 T; 333/166; 333/175; 333/186; 704/271; 381/23.1; 381/314; 381/316
(58) Field of Search .............................. 333/132, 133, 333/19, 20, 28 T, 166, 167, 172, 175, 186, 197, 202; 704/271; 381/23.1, 314, 312, 316

(56) References Cited

U.S. PATENT DOCUMENTS

| | | | | |
|---|---|---|---|---|
| 4,823,795 A | * | 4/1989 | van den Honert | 607/56 |
| 5,736,909 A | * | 4/1998 | Hauser et al. | 333/166 |
| 5,748,838 A | * | 5/1998 | Stevens | 704/261 |
| 5,856,722 A | * | 1/1999 | Haronian et al. | 310/321 |
| 6,243,671 B1 | * | 6/2001 | Lago et al. | 704/200.1 |

FOREIGN PATENT DOCUMENTS

WO     WO 97/13127     * 4/1997

* cited by examiner

*Primary Examiner*—Barbara Summons
(74) *Attorney, Agent, or Firm*—Anne V. Dougherty; Derek S. Jennings

(57) ABSTRACT

Scheme for processing an input signal A(t) by N resonators (17), each having parameters characterizing it, to generate N individual output signals. Then each of the N individual output signals is weighted using a corresponding weight to generate N individual weighted output signals which are superposed to obtain M output signals C(t). One of the parameters or the weight depend on a time signal P(t).

28 Claims, 11 Drawing Sheets

Implementation example:
===================

(read discretization time step)      FIG.13A
get dt

[reset oscillators]

130   for each N     [loop over resonators]
     get omega(N)     [read frequency *2*pi]
     get tau(N)     [read time decay constant]
     get weight(N)     [read weight]

$u_0(N) = (2-(omega(N)dt)^2) / (1+dt/tau(N))$
             [one example of equations describing
             [a damped harmonic resonator]

$u_m(N) = -(1 - dt/tau(N)) / (1+dt/tau(N))$
$u_i(N) = dt / (1+dt/tau(N)) / tau(N)$
             [u are constants]

bm(N) =0     [b are amplitudes of resonators]
b0(N) =0     [bm is amplitude of previous time step]
             [bo is amplitude of actual time step]

131   done with loop over N

[loop over time steps]

132   for each t
     input $a_p$     [read input signal a of the]
             [next time step]

if (first t) then     [the first time, reset stack]
             [for input; otherwise a would]
             [not be defined]

135     $a_0 = a_p$
       $a_m = a_p$
       end if

[calculate difference aprime of input signal a]
     aprime = $(a_p - a_m)$ continue with FIG.13B

FIG.13B continuation of FIG.13A

[propagate resonators; loop over all resonators]

for each N

134        $b_p = u_o(N) * b_o(N) + u_m(N) * b_m(N) + u_i(N) * aprime$

[resonator for following time]
                                               [step]

$b_m(N) = b_o(N)$        [stack is updated/shifted]
        $b_o(N) = b_p$
    done with loop over N

[at this point the weights weight (N) can be recalculated]
[as a function of the $b_o(N)$ ]
[In this implementation example the weights are constant]

[weight and combine resonator output signals to generate]
[output signal c]

$c = 0$
    for each N
      $c = c + weight(N) * b_o(N)$
    done with loop over N

[reset stack for input]
    $a_m = a_o$
    $a_o = a_p$

[output output signal c]

output c 133    done with loop over t end.

SIGNAL PROCESSING BY MEANS OF RESONATORS

TECHNICAL FIELD

The invention concerns signal processing systems comprising resonators arrays and schemes for signal processing.

BACKGROUND OF THE INVENTION

The market of computing expands rapidly in pervasive computing devices (also referred to as tier-0 devices). As these devices will be part of almost every aspect of our life, and as the functions of these devices will become increasingly complex, it is mandatory that the interaction between man and machine mimics the ways humans interact with each other. Thus there is a need of simple signal processing techniques, e.g., for the processing of voice or other audio signals.

There are many other areas where there is a demand for better signal processing systems. Examples are hearing aids, speaker recognition systems, noise suppression systems, and systems that allow a speaker to control certain functions of a computer, device, vehicle, machine, or apparatus, and so forth.

Signal processing typically involves filtering of an input signal in the frequency domain. In the standard approach, the input signal is first transformed in to the frequency domain using well known Fast Fourier Transform (FFT) algorithms. In the frequency domain, implementation of the filter operation is accomplished by a multiplication of the filter response function with the transformed input signal. A filter ed time domain output signal is then recovered by means of a subsequent inverse FFT operation. Although extremely efficient algorithms are known from implementation this approach it suffers from a number of fundamental deficiencies. The FFT transformation is a non-local operation in the time domain. This means that an intrinsic time delay is introduced which is inversely proportional to the frequency resolution of the transformation. In order to avoid disturbing echoing effects the time delay should typically not exceed $10^{-2}$ s in audio applications which corresponds to a frequency resolution of 100 Hz, at best. In order to achieve sufficient frequency resolution for a satisfactory synthesis of the filtered signal one must resort to complex phase analysis methods which substantially increase the computational effort.

Standard signal processing techniques are computationally expensive and are thus not suited for use in voice recognition or speaker recognition as implemented in some tear-0 devices such as smart cards.

Similar problems occur in today's hearings aids, where specified spectral regions are amplified. For these applications the time delay is particular detrimental, because here the original and the processed signal overlap, and thus smear out the subtle time information.

It is a disadvantage of known systems that the time resolution is not high enough to provide reliable cues for use by speech recognition systems.

It is an object of the present invention to provide an improved signal processing approach.

It is an object of the present invention to provide an improved signal processing approach which is suited for use in hearing aids.

It is an object of present invention to provide an improved signal processing approach for use in speech recognition or speaker recognition systems.

It is an object of the present invention to provide an improved signal processing approach for processing acoustic signals.

SUMMARY OF THE INVENTION

The present invention concerns a method, signal processing system, a computer program element, and a computer program product as claimed in the claims.

Advantages of the present invention are either explicitly addressed in the detailed description or are obvious from the disclosed.

DESCRIPTION OF THE DRAWINGS

The invention is described in detail below with reference to the following schematic drawings. It is to be noted that the Figures are not drawn to scale.

FIG. 13A Is a pseudo-code representation of a possible software implementation of a general damped (harmonic) resonator array in accordance with the present invention.

FIG. 13B is a continuation of the pseudo-code representation of FIG. 13A.

DESCRIPTION OF PREFERRED EMBODIMENTS

Figure 1A:
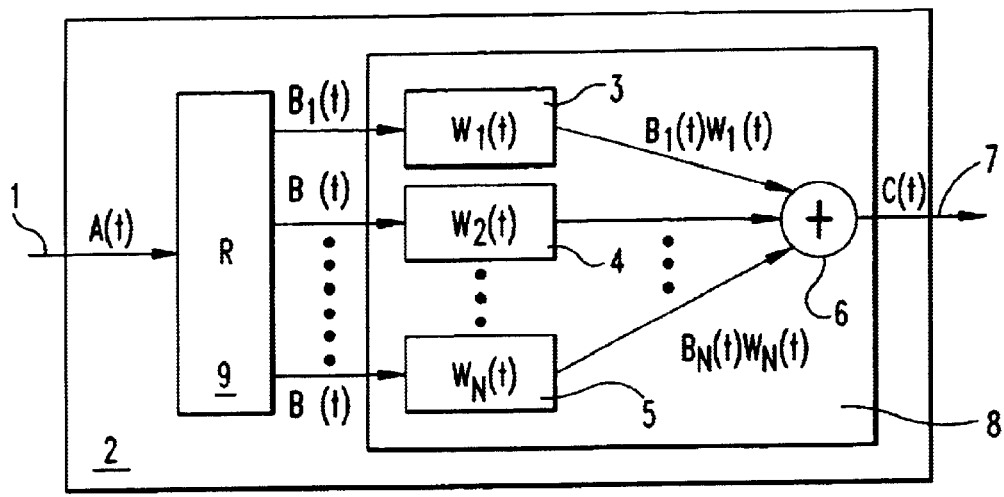
FIG. 1A is a schematic block diagram of an embodiment, in accordance with the present invention.

The basic concept of the present invention and some basic terms and expressions are described in the following.

A resonator in the most basic sense is a selective filter that damps or suppresses certain frequencies. A resonator can be described or characterized by its response function. The response function describes the filter characteristic (the frequency dependent attenuation and phase shift) of a resonator.

There are many ways to realize a resonator. A mechanical or micro-mechanical resonator for example might comprise a cavity or hollow body which vibrates sympathetically with another vibrating system, such as the air through which an audio wave is travelling. The resonator can also be implemented by means of micro-mechanical approaches using mechanical resonators such as cantilevers.

Micromechanical systems comprising cantilevers are well known and easy to make. Existing semiconductor techniques can be employed. In essence, the techniques of micromachining are employed to create cantilever arrays. Details on how to make such arrays are described in co-pending patent application PCT/IB95/00817 which was published on Apr. 10, 1997 under publication number WO 97/13127 and in co-pending patent application PCT/IB96/00636 which was filed on Jul. 3, 1996. The resonator array is obtained which has resonators with well defined Q-factors and resonance frequencies.

Bridges or membranes can be used instead of cantilevers. It is also conceivable to employ a combination of cantilevers, with bridges or membranes.

If a micromechanical resonator array is to be used in connection with an electrical signal processing circuitry (e.g. a reconstructor which assigns weights and superposes the weighted signals), then the mechanical signals (vibration of the micromechanical resonators) has to be transformed into electrical signals. This can be done by means of so-called detectors. Well suited are piezoelectric or piezoresistive detectors. Examples are given in above-mentioned co-pending PCT applications WO 97/13127 or PCT/IB96/00636. Likewise, well-known optical methods or capacitance sensing can be used to transform vibrational movement into electrical signals.

A mechanical resonator can also be realized using a system of springs.

A resonator can be implemented by means of analog electronics using impedance, capacitors and resistors. In addition, active devices such as MOSFETs driven below switching threshold can be used to amplify signals. A resonator can also be realized by a filter that blocks high frequencies and another filter that blocks low frequencies. If these two filters are coupled in a suited manner one obtains a filter response function which is a superposition of the response functions of the two filters. This filter response function might have a shape that is comparable to the shape of a resonator's response function.

Likewise, resonators can also be implemented in a computer system using some suited code that embodies algorithms.

A resonator can also be realized as a combination of any of the above-described approaches.

All practical resonators show a loss of energy due to friction (internal or external) or other resistance. This is called damping. The resulting decrease in amplitude of the system is known as the decay. The term damping, then, is restricted to the system itself, rather than to the sound of the system in an environment.

Decay is the process whereby the amplitude of oscillation of a vibrating system (such as a resonator) diminishes with time due to a loss in energy. The loss of energy is what is usually called damping. The decay constant $\tau$ (also known as decay time) is the time required for the amplitude of a vibrating system to decrease to approximately 37% (or 1/e) of its initial value.

A resonator—when set in motion—vibrates both as a whole, with a frequency called the fundamental, and, with lesser intensity, in sections as well. If these smaller lengths are integer fractions ($\frac{1}{2}$, $\frac{1}{3}$, $\frac{1}{4}$, ...), their frequencies of oscillation are called harmonics, and are integer multiples of the fundamental. Other resonating frequencies which are not whole multiples of the fundamental may also be present, and are called partials or inharmonic resonating frequencies. A resonator vibrates as a whole and damps or suppresses certain frequencies. That is, a resonator has some sort of a filter function.

The present scheme makes use of the fact that an arbitrary time domain signal $A(t)$ can be approximated by a linear superposition of response functions of resonators, and in particular Lorentzian resonators, with resonance frequencies and Q-factors chosen at will.

The present scheme can be realized in a computing system such that the response functions are generated by numerical integration of second order differential equations which are associated with the resonators or Lorentzian resonators. This is numerically efficient and avoids problems which are encountered with the FFT approach, namely, time delays can be made negligible and the full spectral information is preserved, viz. there is no limit on the frequency resolution. The present scheme is real-time and first results are available right away. This is important for hearing aids, for example, where delay leads to echoing. FFT by comparison is a global transform approach that provides results with some delay.

Audio signal processing systems form the basis for signal enhancement and noise reduction in a variety of voice related applications, such as speech recognition, speaker recognition, and voice synthesis. The present scheme using a resonator array serving as dynamic filter array provides a powerful architecture for the implementation of algorithms that closely match signal processing in natural hearing and speaking. This property is considered to be a major innovative step leading to a new class of Audio signal processing systems (audio processors) that improve the overall performance of future voice products. For example, speech recognition relies on a front end that transforms the voice signal into a set of descriptions (termed cues) of the properties of the signal. The quality of the cues is extremely critical for the robustness of the system in terms of speaker and environmental dependencies. The results that can be obtained with current systems are far from satisfactory. The dynamic filter array, according to the present invention, allows to construct efficient algorithms for generating better descriptor sets, in particular also with respect to noisy environments, e.g., voice computer communication in cars.

The present scheme can also be used for processing of signals other than audio or voice signals. In other words, the present scheme can be used in many different kinds of signal processing systems.

Figure 1B:
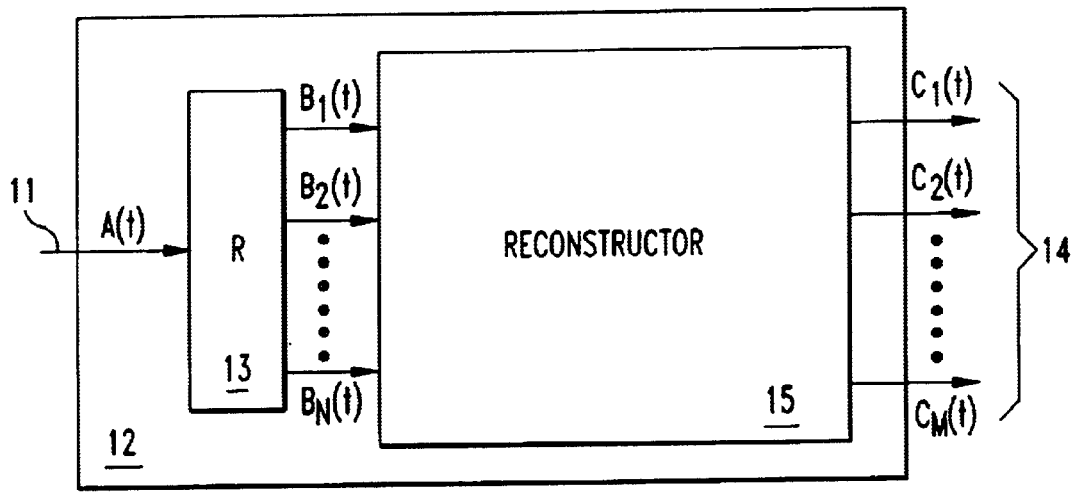
FIG. 1B is a schematic block diagram of another embodiment, in accordance with the present invention.
Figure 1C:
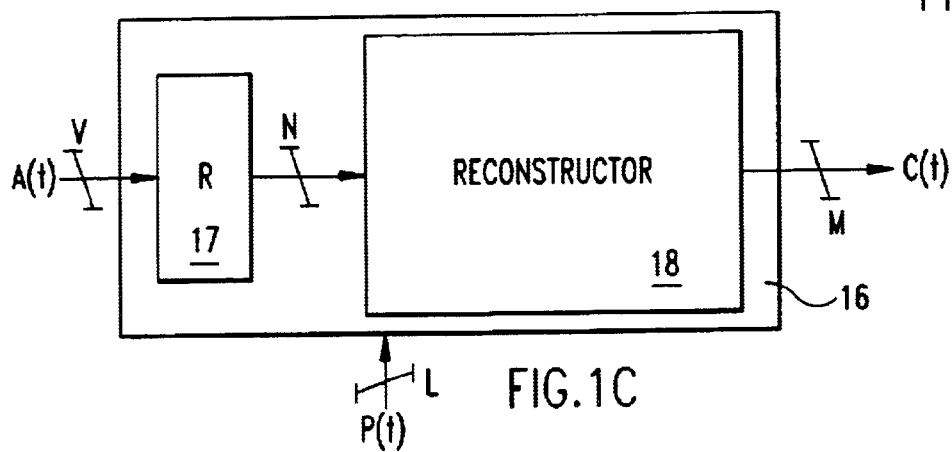
FIG. 1C is a schematic block diagram of another embodiment, in accordance with the present invention.

According to the present invention, an input signal $A(t)$ is received via an input line 1 and analyzed by a signal processing system 2 using a (damped) resonator array 9, as schematically illustrated in FIG. 1A (note that there can be more than one input signal, as shown in FIG. 1C for example). The simplest form of a resonator is that of a damped harmonic oscillator, which follows the differential equation $$\frac{d^2 B_i(t)}{dt^2} = -\varpi_i^2 B_i(t) - \frac{2}{\tau_i}\frac{d}{dt}[B_i(t) - A(t)] \quad (1)$$

where $B_i(t)$ is the response of the i-th resonator and $A(t)$ is the input signal (e.g., a voice input signal). $\omega_i$ are the resonance frequency of the i-th resonator and $\tau_i$ is the corresponding decay constant. The Q-factor is defined by $Q=\omega\tau/2$.

The resonator can be implemented as an algorithm for digital computers using Verlet algorithm, for example, to solve the different equation for the resonators of array 9.

$$B_i(t+\Delta) = \frac{2-(\varpi_i\Delta)^2}{1+\Delta/\tau_i}B_i(t) - \quad (2)$$
$$\frac{1-\Delta/\tau_i}{1+\Delta/\tau_i}B_i(t-\Delta) + \frac{\Delta/\tau_i}{1+\Delta/\tau_i}[A(t+\Delta) - A(t-\Delta)]$$

Where $\Delta$ is the discretization time step.

$$\frac{B_i(\varpi)}{A(\varpi)} = \left[1 + i\frac{\tau_i\varpi_i}{2}\left(\frac{\varpi}{\varpi_i} - \frac{\varpi_i}{\varpi}\right)\right]^{-1} \quad (3)$$

It is normalized to 1 at the resonance frequency, where the absolute value of the response is maximum. For $\omega >> \omega_i$ the amplitude response decays as $$-\frac{2i}{\tau\varpi_i}$$

and for $\omega >> \omega_i$ the amplitude response decays as $$\frac{2i}{\tau\varpi_i}\frac{\varpi}{\varpi_i}.$$

The response of an array of resonators 9 is weighted with factors (weights $W_i(f_i,t)$), that may depend on the resonator, i.e. its frequency $f_i=\omega_i/2\pi$, and the time t. The weight factors may be calculated using some formalism from the actual input signal A(t) in order to respond to the instantaneous environment. As an example one might exploit the quasi periodic nature of vowels, by using a pitch dependent, oscillatory amplification, to enhance certain speakers above the noise level. The weighting of signals is schematically illustrated by means of weighting units 3, 4, and 5. These weighting units 3–5 are part of a so-called reconstructor 8.

The weighting may be such that characteristic speech sounds are optimally separated from others and from background noise. Using the weighted response may directly identify different vowels and classes of consonants.

Likewise, the weights can be constant. Under certain circumstances one or more of the weights might even be equal to 1, i.e. $W_i=1$.

A combined signal C(t) is composed by superposing the i weighted resonator signals. In the following equation the superposition is a summation of the i weighted resonator signals.

$$C(t) = \sum_i W_i(t)B_i(t). \quad (4)$$

The superposition is done by a superposition circuit 6 that is part of the reconstructor 8.

Note that in the present context the word superposition is used to describe any mathematical operation (adding, subtracting, multiplying, dividing, and so on) that is employed to process the i weighted resonator signals such that M output signals C(t) are obtained, where M∈N (in other words M=1, 2, . . . ). Preferably, M<N.

Another embodiment is illustrated in FIG. 1B. An input signal A(t) is received via an input line 11 and analyzed by a signal processing system 12 using a resonator array 13. The N individual output signals $B_1(t)$, $B_2(t)$, . . . , $B_i(t)$ of the array of resonators 13 are forwarded to a reconstructor 15. This reconstructor assigns an individual weight $W_1(t,f_i)$ to each of the N individual output signals $B_1(t)$, $B_2(t)$, . . . , $B_1$, (t) to generate N individual weighted output signals. Furthermore, the reconstructor 15 provides for a superposition of these N individual weighted output signals to generate M output signals $C_1(t)$, $C_2(t)$, . . . , $C_M(t)$ with M∈N (i.e., M=1, 2, . . .).

The invention lies in the fact to replace traditional signal processing approaches, which are based for example on Fourier or Laplace transforms, directly by the response of a differential equation, that selects certain spectral features. The advantage of the invention lies in its simplicity, its flexibility with respect to spectral resolution, which may itself depend on the frequency region, and in the nearly eliminated time lag between input signal A(t) and resonator response B(t).

The present methodology can be generalized to resonators having arbitrary response functions using other differential equations for the resonator response or their corresponding physical implementation. The differential equations are not limited to second order.

The resonator array may comprise N Lorentzian resonators, or any combination or arrangement of K Lorentzian resonators that are connected or coupled so as to form N resonators, or N non-Lorentzian resonators, or any combination or arrangement of K non-Lorentzian resonators that are connected or coupled so as to form N resonators, or any combination of Lorentzian and non-Lorentzian resonators so as to form N resonators (with K≦N and K, N∈N). Please note that the resonators can be implemented in hardware, software, or a combination of hardware and software.

In known FFT-based signal analysis the response time is given by the lowest resolved frequency for all Fourier components. With the present scheme, the response time is given directly by the decay time $\tau_i$, which can be selected at will and for each resonator individually. Thus high time resolution can be achieved in the high frequency region, which is less relevant for vowels but which is important for a number of constants, for which time resolution is crucial.

In order to be able to design an efficient system, or a system that is well suited for a particular application, there is some time dependency introduced. In other words, at least one of the parameters (i.e. the resonance frequency, or the weight, or the Q-factor, or the like) describing or characterizing the present signal processing system are time dependent. This is schematically illustrated in FIG. 1C where there are L time signals P(t), with L∈N (i.e., L=1, 2, . . .). These L time signals P(t) are fed to a signal processing system 16 which comprises a resonator array 17 and a reconstructor 18. Please note that the system of FIG. 1C is more general than the systems 2 and 12 of FIGS. 1A and 1B because there are V input signals A(t) with V∈N (i.e., V=1, 2, . . .). These V input signals can be independent. It is for example conceivable that there are V microphones each of which provides an input signal $A_i(t)$ to the system 16.

There are several options to generate or derive the L time signals P(t). These signals can be generated or derived from the input signal(s) A(t) (in a feed forward fashion).

the M output signals C(t) (in a feedback fashion), any signal inside the signal processing systems 2, 12, or 16, another signal processing system, another reconstructor, another resonator array, or a computer system.

One possible software implementation of a general damped (harmonic) resonator array is now described by means of a pseudo-code representation which is illustrated in FIG. 13A and 13B. These Figures comprise comments in brackets [].

This software implementation of a general damped (harmonic) resonator array comprises a first loop (this loop starts at reference number 130 and finishes at reference number 131) that is used to describe the behavior and properties of each of the N resonators of a resonator array and the weights weight(N). At the beginning of this loop omega(N) (=f2π), the time decay constant tau(N), and weight(N) of the respective resonators are fetched. Then a set of constants are calculated that allows to represent Equation (2) in the form $$B_1(t+\Delta)=\mu_{0_i}B_i(t)+\mu_{m_i}B_i(t-\Delta)+\mu_{t_i}[A(t+\Delta)-A(t-\Delta)] \quad (2a)$$

that describes the behavior of the respective resonators. At the end of this loop 130–131 the amplitudes $b_m$ and $b_o$ are initialized to zero. Note that the Equation (2a) is actually solved farther down (indicated by reference number 134 in FIG. 13B) in the pseudo-code and not inside the first loop 130–131.

This first loop 130–131 is followed by a loop 132–133 over time steps $t_i$. The stack for input signal a (at reference number 135) is reset when running through this loop 132–133 for the first time. This is necessary, because the stack 135 would otherwise be undefined. Then the difference aprime of the input signal a at two time steps is determined. The resonator amplitudes $B_i$ are depending on the actual value of aprime.

If the weights (weight(N)) are constant, then the output signal c can be calculated right away by weighing and superposing the individual resonator output signals. If the weights (weight(N)) are not constant, then they have to be calculated before weighting according to same procedure and superposing the individual resonator output signals. Note that in the present software implementation the individual resonator output signals are superposed by means of adding them.

Figure 2:
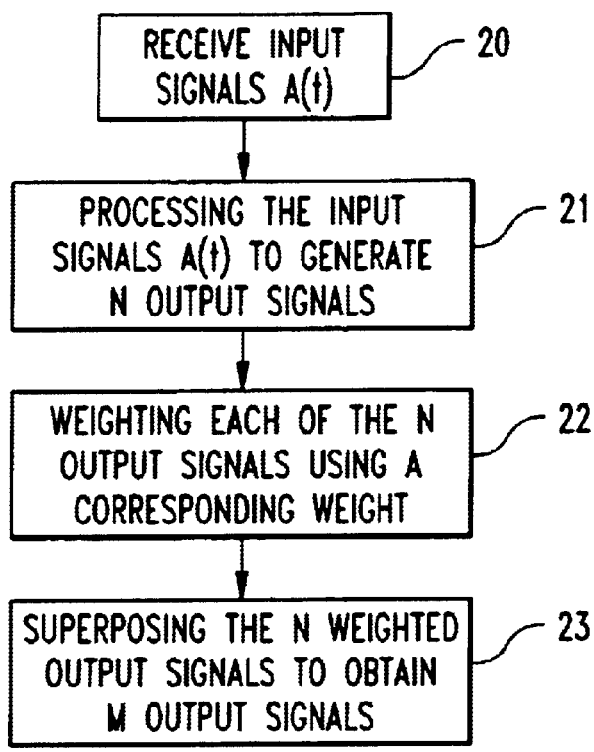
FIG. 2 is a schematic flow chart that is used to illustrate aspects of the present invention.

The underlying scheme can be further generalized, as illustrated in the schematic flow chart given in FIG. 2. In a first step (box 20), an input signal A(t) is received. This input signal A(t) is then processed by N resonators such that N individual output signals $B_1(t), B_2(t), \ldots, B_1(t)$ are generated (box 21). These N individual output signals $B_1(t), B_2(t), \ldots, B_N(t)$ are weighted using a corresponding weight $W_1(t), W_2(t), \ldots, W_N(t)$ for each output signal to generate N individual weighted output signals, as indicated in box 22. As a result of this step the following N individual weighted output signals are obtained: $B_1(t)W_1(t), B_2(t)W_2(t), \ldots, B_N(t)W_N(t)$. The weighting of signals is schematically illustrated by means of boxes 3, 4, and 5. Finally, the N individual weighted output signals are superposed by a superposition circuit 6 to generate M output signals $C_1(t), C_2(t), \ldots, C_M(t)$, with M∈N (i.e., M=1, 2, . . . ) (see box 23). Please note that in FIG. 1A there is just one output signal C(t) provided at output line 7, i.e., in this implementation example M=1.

The generation of the N output signals $B_1(t), B_2(t), \ldots, B_N(t)$ can either be done concurrently (i.e. in parallel), or sequentially. A mechanical resonator array with N cantilever resonators will process the input signal A(t) concurrently to generate the N output signal $B_1(t), B_2(t), \ldots, B_N(t)$, whereas a computer program implementation (such as the one described by means of pseudo-code) may generate the N output signals $B_1(t), B_2(t), \ldots, B_N(t)$ one after the other, i.e. sequentially. In the above pseudo-code example this is done by means of a loop which is run through N times. If the N output signals $B_1(t), B_2(t), \ldots, B_N(t)$ are generated sequentially, the respective output signals have to be stored (either before the weighting step or afterwards) until all N output signals are available for superposition.

Now the architecture of an audio processor embodiment, based on the resonator transform method, is described. In particular, the present scheme is exemplified using an adaptive digital hearing aid as a working embodiment.

At high frequencies the frequency resolution of the human ear is lower than at low frequencies. Correspondingly also the frequency resolution, and with it the spacing of resonators of a resonator array, can be matched accordingly, saving computational resources, for example. Realization of such an unequal spacing in the frequency domain is nontrivial in standard approaches.

In the following section the frequency-dependent signal amplification of hearing aids of hearing aids is described. Hearing aids amplify certain spectral regions. Existing technology uses Fourier transforms of the input signal on short time intervals. This technique incorporates a fixed time lag between input signal and the synthesized output signal, which is inversely proportional to the frequency resolution. Fourier transformation requires inherently to compromise frequency information with time information. This is problematic because speech exploits both extreme time and frequency resolution simultaneously. The amplified signal is synthesized in the traditional approach from scratch using the Fourier back transformation.

According to the present invention, the audio input signal A(t) is only enhanced using a resonator transformation, and the frequency information such as the pitch remains fully intact, because the resonator oscillates with the same frequency as the audio input signal A(t). This approach mimics to some extent the human hearing apparatus, i.e. the cochlea, which can be looked upon as a complex resonator array.

Figure 3:
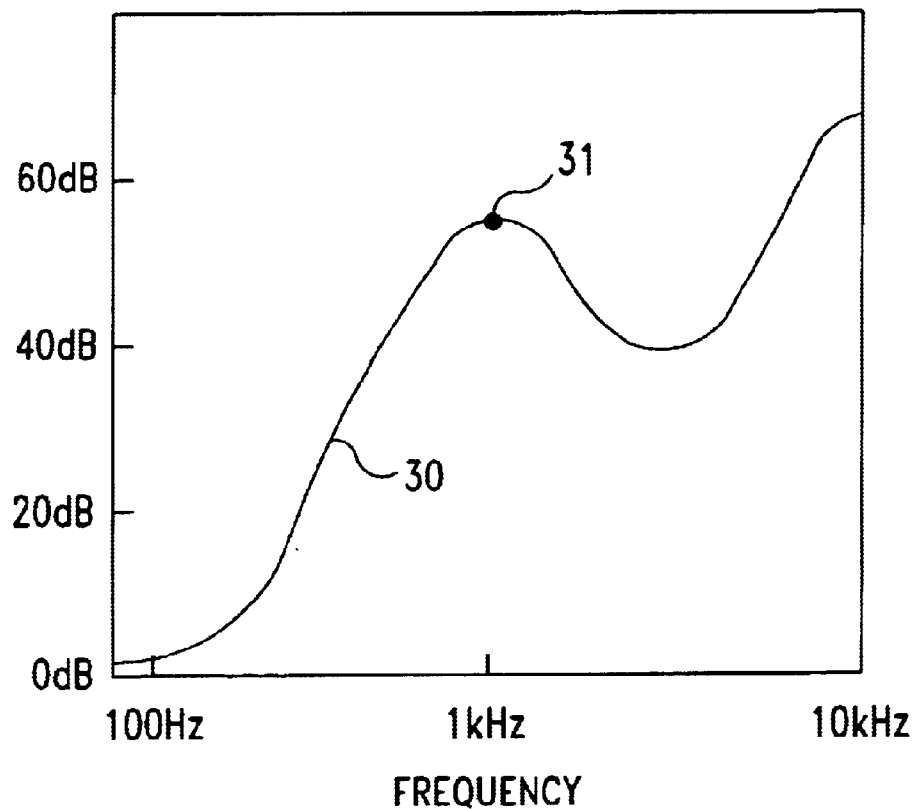
FIG. 3 shows the hearing threshold of an impaired ear relative to normal hearing.
Figure 4:
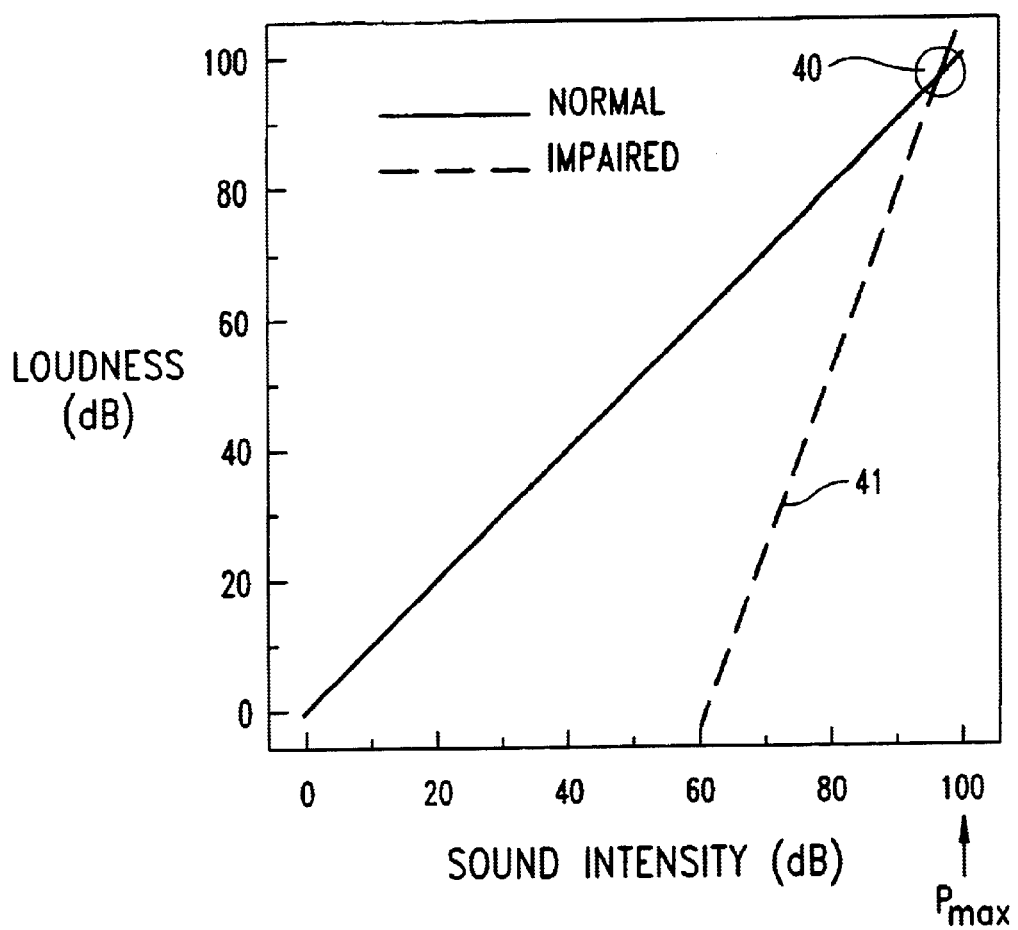
FIG. 4 is a schematic of loudness growth in normal (solid line) and impaired (dashed line) ears used to illustrate recruitment. $P_{max}$ denotes the intercept point for equal loudness perception of normal and impaired hearing.
Figure 5:
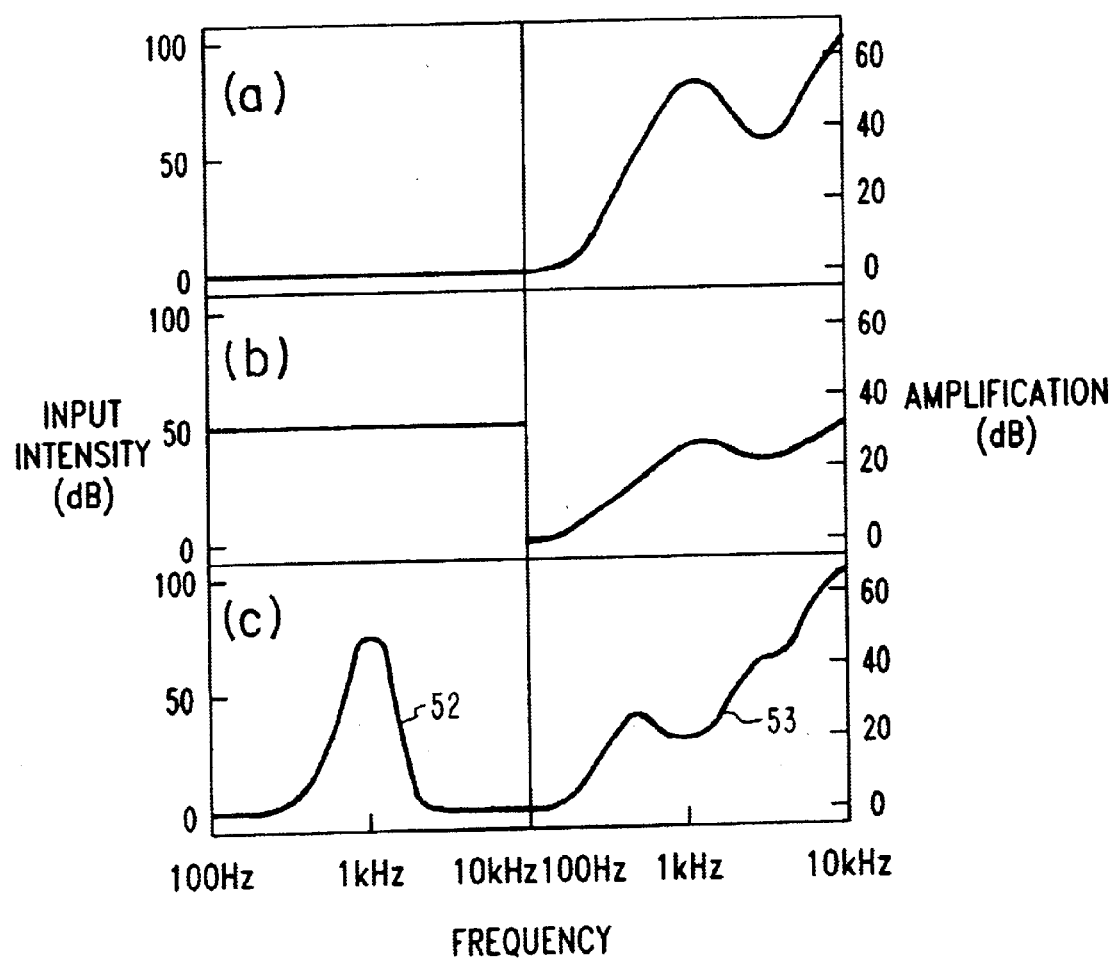
FIG. 5 is a schematic that shows the adjustment of the amplification in a hearing aid, according to the present invention, depending on the spectral sound intensity. (a) Amplification vs. frequency is equal to the hearing threshold curve of the impaired ear for a white noise input spectrum with an intensity of 0 dB (hearing threshold for normal hearing). (b) Same as (a) but now the input intensity is P=50 dB corresponding to the loudness of a normal conversion. To account for recruitment the amplification curve must be re-scaled by a factor of (1–P/$P_{max}$=0.5) (c) The spectral intensity of real sound signals is non-uniform. Correspondingly, the scale factor is frequency dependent giving the amplification curve an entirely different shape from the original threshold curve.

Hearing impairment is characterized by elevated thresholds for the detection of sounds in quiet. A typical example for the hearing threshold curve 30 of an impaired ear is shown in FIG. 3. A prominent characteristics is the steep increase of the hearing threshold above 200 Hz with a first maximum of 50 dB at 1 kHz (reference number 31) and a further increase of the threshold in the 10 kHz range. Despite the loss in sensitivity, a sound at high intensity might sound equally loud to a hearing impaired listener as it does to a normally hearing listener. In other words, there is an abnormally steep growth of loudness with intensity in the impaired ear. This phenomenon, called recruitment, is illustrated in FIG. 4. Because of recruitment, restitution of impaired hearing cannot be accomplished by means of a simple linear filter which compensates the loss of sensitivity of the ear. In order to preserve a natural perception of loudness, amplification of the sound intensity at a particular frequency must be adjusted according to the hearing threshold and according to the momentary intensity at this frequency. This process is illustrated in FIG. 5. In panel (a), a white noise input spectrum with 0 dB intensity is considered, meaning that the noise is just at the detection threshold for a normal hearing person. Note that the curves on the left hand side of FIG. 5 represent the input intensity in dB, whereas the curves on the right hand side represent the characteristics of a hearing impaired person (amplitudes in dB). In order to create the same acoustical sensation for a person with hearing impairment the noise spectrum must be amplified by the same amount as the hearing threshold (see FIG. 4) increases at a given frequency. Using these amplification factors for an input noise level of 50 dB (see panel (a)), which corresponds to the loudness of a normal conversion, the sound pressure at the impaired ear would be in excess of 100 dB at frequencies above 1 kHz.

Due to recruitment, such a sound level is perceived as extremely loud if not painful also by a person with hearing problems. To create a balanced acoustic sensation the amplification curve may be scaled for example such that the perceived loudness level is 60 dB for all frequencies. For the example shown in FIG. 3, the hearing threshold at 1 kHz is at about 60 dB which corresponds to the situation depicted in FIG. 4. From the dashed curve 41 in the FIG. 4 one can conclude that the physiologically correct sound pressure is 80 dB. In other words, an amplification of 30 dB is sufficient as opposed to $A_0$=60 dB for low level signals. It follows that the scaling transformation for linear recruitment is a multiplicative compression of the amplification curve according to $$A = A_0(1 - P/P_{max}) \quad (5)$$

where P is the sound pressure of the input signal and $P_{max}$ the intercept point 40 (approx. 100 dB, see FIG. 4) for equal loudness perception of impaired and normal hearing. The spectral distribution of real sound signals (curve 52) 52 is not uniform, however (see panel (c) in FIG. 5). Accordingly, the scaling factor varies with frequency. Correspondingly, the shape of the amplification curve 53 which is adjusted dynamically can deviate substantially from the hearing threshold curve 30 (see FIG. 3).

The present resonator transform method is ideally suited for implementing acoustical signal processors as it provides a natural path for implementing functionality which closely resembles the way in which the cochlea of the ear operates. It is to be emphasized at this point that the cochlea does not perform a sharp Fourier analysis of sound signals. It is, in fact, more appropriate to visualize the cochlea as a bank of broad band filters which can be roughly approximated by Lorentzian resonators with a Q-factor of the order of 3 to 5. The loudness perception is proportional to the logarithm of the physical intensity and thus an extremely large dynamic range can be processed by the ear. In order to cope with this property, signals should be represented by at least 16-bit numbers, if the present invention is realized in a computer system. It is also important to realize that loudness fluctuations by tends of dB occur which milliseconds in natural sounds which calls for a rapidly responding system. Hence, it is advantageous to employ low Q-factor resonators in an audio processor. For this reason, the Q-factor of the individual resonators should be below 100 and preferably below 10. A suited range for the Q-factor is between 1 to 5.

Figure 6:
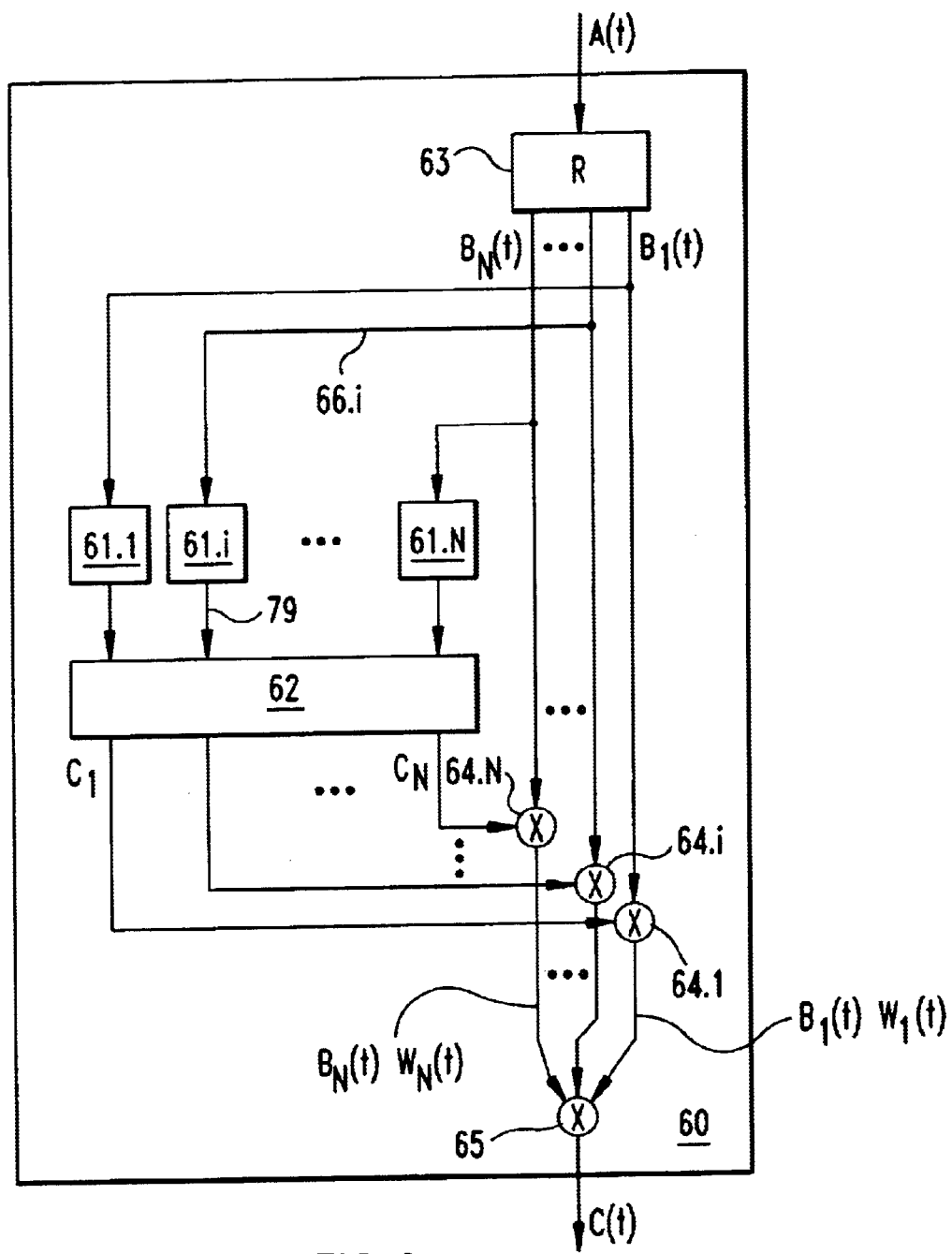
FIG. 6 Is a schematic drawing of an embodiment of a hearing aid in accordance with the present invention.

FIG. 6 describes a hearing aid embodiment. A block diagram of the signal processing system 60 that is part of the hearing aid is shown in FIG. 6. The input data A(t) is a discrete stream of 16-bit samples taken at a rate of $f_1$=44.1 kHz. The resonator array 63 splits the incoming signal A(t) into N resonator transforms $B_i(t)$. Depending on the actual value of the resonator transforms the weights $W_i(t)$ for the resonator transforms are calculated, which are multiplied with the resonator transforms in the devices denoted with 64.1–64.N before the weighted resonator transforms (herein referred to as N individual weighted output signals) are combined in the superposition circuit 65 to form the output signal C(t). In the present embodiment two steps are involved in determining the weights $W_i(t)$. The first step (calculation of filter function) determines the relevant sound pressure in each resonator transform, and from the optimum amplification at this frequency. The calculation of the filter function is carried out by units 61.1–61.N. Then a filter function is synthesized by an approximation circuit 62 to produce an amplification as given by the instantaneous frequency dependent sound pressure $<I(\omega_i)>$. For this purpose, the approximation circuit 62 evaluates the weights $W_i(t)$ according to Equation (8). Units 61.1–61.N and 62 serve the dynamic calculation of $W_i(t)$.

In the embodiment of FIG. 6 the resonator transforms $B_i(t)$ are calculated by means of a numerical integration of a generic differential equation similar or equal to the one given as Equation (1).

The resonator transform corresponds to a filtering of the input signal A(t) with the resonator transfer function being given by Equation (3).

In the present embodiment of the bearing aid (see FIG. 6), 15 resonator transforms are used. They have a constant Q-factor of 3 and their resonance frequencies $\omega_i$ are logarithmically spaced over two decades between 100 and 10,000 Hz. The output signal C(t) is a linear superposition of the resonator transforms $$C(t) = \sum_i^N W_i(t) B_i(t) \quad (6)$$

where the weights $W_i(t)$ are real numbers. They are calculated such that the desired transfer characteristics of the signal processing system 60 is obtained. Calculation of the weights $W_i(t)$ involves two steps. Firstly, in each sampling interval the momentary filter function is determined by circuits 61.1, 61.2, ..., 61.N, and secondly, the desired filter function is approximated in an approximation circuit 62 by the resonator response functions using a least squares fit procedure. Note that the circuits and other elements of FIG. 6 may represent a software implementation as well as a hardware implementation of the present scheme.

Figure 7:
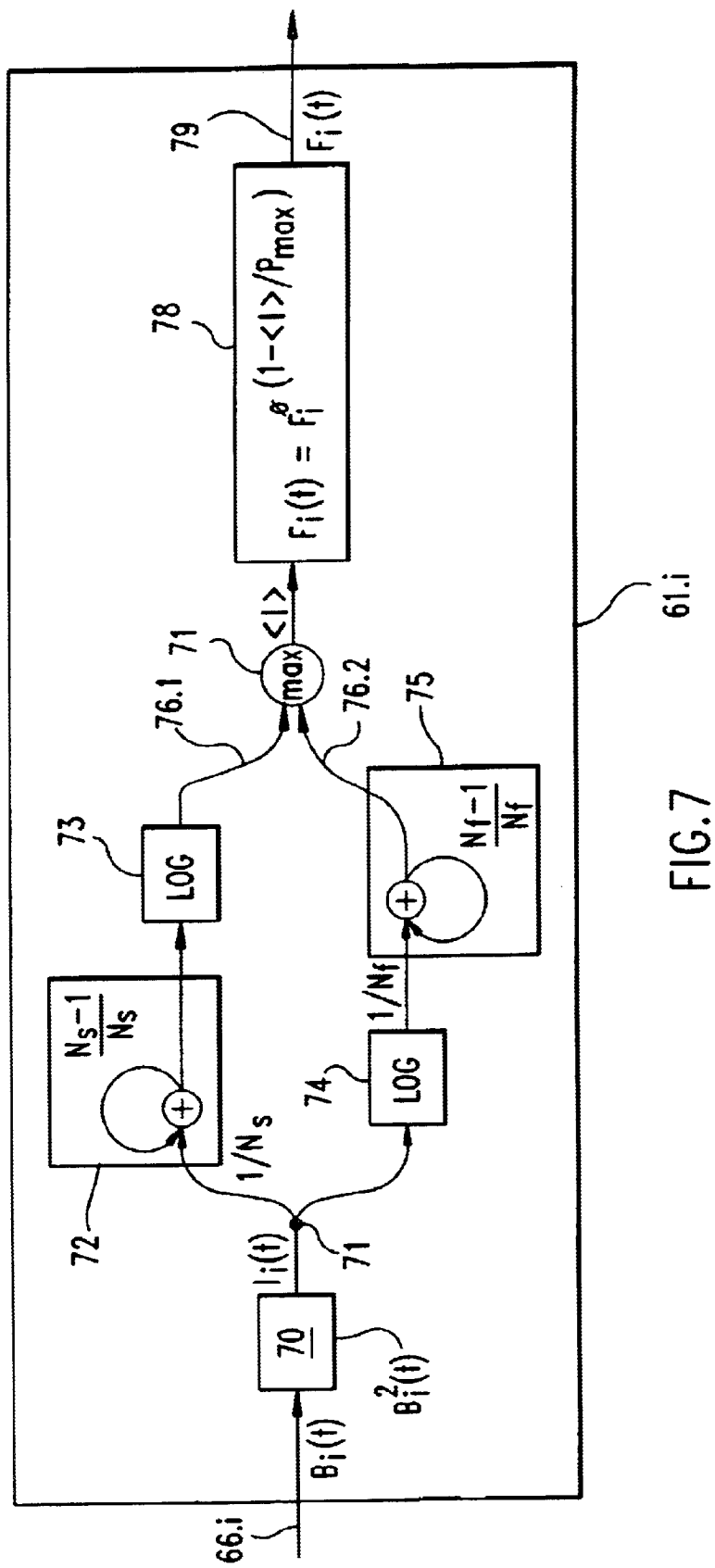
FIG. 7 Shows exemplary elements of the unit 61.i in FIG. 6.

Calculation of the filter function by circuits 61.1, 61.2, ..., 61.N is described in connection with FIG. 7 with shows exemplary elements of one such unit 61.i. For the evaluations of the filter function a measure of the sound pressure in each resonator transform is determined. This measure should on the one hard reflect the average sound pressure over a period of some seconds. On the other hand sudden rises in sound pressure must be detected so that the system can shut off amplification quickly to avoid damage to the ear. For this purpose, the resonator transform $B_i(t)$ is processed by unit 70 to obtain the intensity signal $I_i(t)$. Then, the signal $I_i(t)$ is split into two signals at 71. One of the signals $I_i(t)$ is processed though a resonator 72 that has non-zero damping with a τ in the range of seconds. This resonator 72 is relatively slow damped resonator which averages the signal over time. The logarithm of the result is taken by a unit 73. The logarithm of the second part of the signal $I_i(t)$—as generated by unit 74—is transformed using a similar resonator 75 with zero frequency and a damping in the range of milliseconds. The second resonator 75 is faster than the first resonator 72. The two processed branches 76.1 and 76.2 are combined into a measure <I> of the relevant sound pressure at the frequency of the resonator transform. The combining of signals is done by unit 77. This sound pressure is then used to determine the filter curve at the given frequency adjusted to the sound pressure according to Equation (7). This is done by unit 78. The output line 79 is connected to the approximation circuit 62.

The intensity of the i-th resonator response $I_i(t)=B_i^2(t)$ corresponds to the spectral power of the input signal A(t) at $\omega_i$ averaged over a frequency band of width $\omega_i/Q$. For each resonator an averaged logarithmic spectral intensity, $<I_i>$ is calculated which is defined as the maximum of the logarithm of a low running average of $I_i(t)$ with a time constant $\tau_s$=0.5s (resonator 72) and a fast running average (resonator 75) of the logarithm of $I_i(t)$ with a time constant $\tau_f$=5 ms for $\omega_i>2\pi\cdot400$ Hz and $\tau_f$=5 ms·$2\pi\cdot400$ Hz/$\omega_i$ for $\omega_i>2\pi>400$ Hz (note that taking the logarithm of the average and taking the average of the logarithm are inequivalent operations). The running averages are obtained by means of a recursive summation algorithm in which the output of step n+1 is set equal to the input multiplied by a weight $1/N_{sf}$ plus the output of step n multiplied by a weight $N_{sf}-1/N_{sf}$ where $N_{sf}=f_s\tau_{sf}$ is the number of steps over which the average is performed. The intensity algorithm is designed to follow fast intensity peaks quasi instantaneously while at the same time is also provides a measure of the average sound level. In accordance with Equation (5) the transfer function $F(\omega_i)$ of the adaptive filter sampled at $\omega_i$ is derived from the spectral intensities $<I_i>$ using the transformation $$F(\overline{\omega}_i)=F_0(\overline{\omega}_i)^{(I->I_i> 1P max)} \qquad (7)$$

where $F_0(\omega_i)$ is the heating threshold of the impaired ear at $\omega_i$. Thus recruitment is individually accounted for in each frequency band that is sampled by the corresponding resonator.

The desired filter transfer function is defined only at the resonator eigen-frequencies $\omega_i$. The complete transfer function is interpolated using a linear superposition of the resonator response functions and imposing the minimization criterion $$\sum_{j=1}^{N}\left(\left|\sum_{i=1}^{N} C_i R_i(\varpi_j)\right| - F(\varpi_j)\right)^2 = \min \qquad (8)$$

The minimization problem is solved iteratively using a standard Newton algorithm whereby one iteration step is performed per sampling interval. Note that the filter function is continuously updated during iteration. In each iteration step a new set of weights $C_i$ is computed which is used for the synthesis of the output signal (see Equation 6).

The above hearing aid was tested with a test person from whom the hearing threshold curve shown in FIG. 3 was available. The overall performance was very positive. In particular, comprehensibility of natural speech was better than with the test person's conventional hearing aid. The test person was able to hear sounds that were not known to him before. This is an indication that the high frequency gain of standard hearing aids is kept rather low on purpose in order to suppress painfully loud sound levels at the ear.

Figure 8:
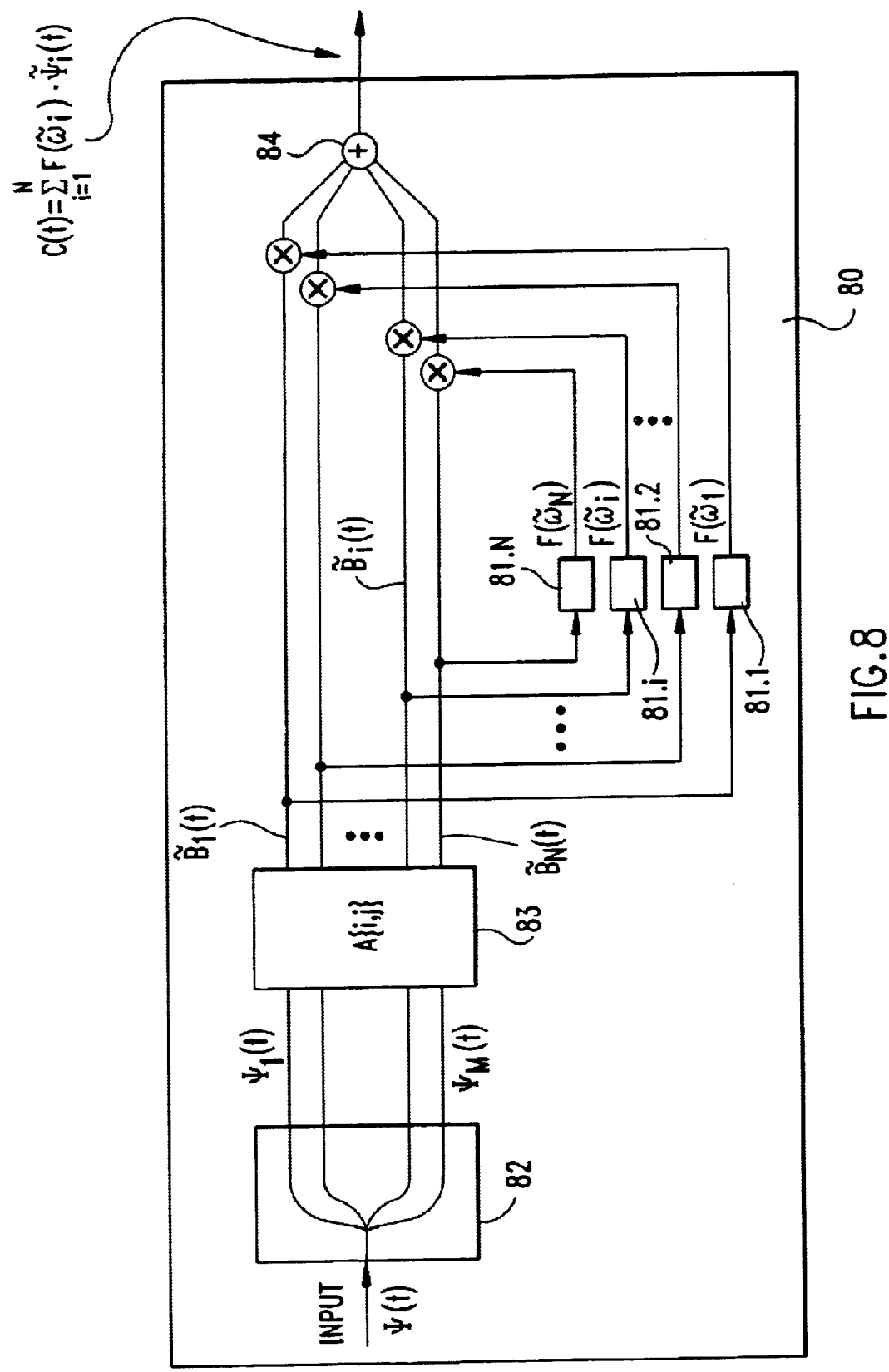
FIG. 8 Is an alternative embodiment of a hearing aid using a set of pseudo-orthogonal basis functions which are derived from the resonator transforms by means of a linear transformation.

An alternative implementation of the adaptive filter (a pseudo-orthogonal basis function filter 80) is shown in FIG. 8. In this Figure an implementation of a hearing aid using nearly non-overlaping frequency responses is implemented. By suitable superposition of the N resonator transforms in a mixing matrix 83 with weights A{i,j}, N new resonators transforms are constructed, which have a narrower frequency response. The Lorentzian resonators 82 together with the mixing matrix 83 form a non-Lorentzian resonator array. As each resulting resonator transform $\hat{B}_i(t)$ (set of quasi-orthogonal basis functions) is localized in a narrow frequency domain, the coefficients $C_1$ in Equation (8) can be taken to be $F(\omega_i)$. Hence, only the filter function needs to be calculated by units 81.1–81.N and the synthesis of the filter function is just an identity transform.

The basis functions are linear superpositions of resonator transforms $$\hat{B}_i(t) = \sum_{k=1}^{L} A_{ij} B_j(t) \qquad (9)$$

and they are constructed such that they have a Lorentzian line shape at their resonance frequencies $\hat{\omega}_i$ and such that the mutual spectral overlap can be neglected from the purpose of the filter synthesis, as indicated above. As a result, approximation of the filter transfer function by circuitry 81.1, 81.2, ..., 81.N is straight forward. The output signal C(t) is a linear superposition (performed by superposition unit 84) of the $\hat{B}_i(t)$ with the weights now being equal to the desired amplification of the filter, $F(\hat{\omega}_i)$, at the corresponding resonance frequency. The weights $F(\omega_i)$ are computed by the same method as in the embodiment that is illustrated in FIG. 7.

We use N=10 basis functions to implement the adaptive filter for the hearing aid of FIG. 8. The center frequencies of the basis functions are again logarithmically spaced over a frequency range from 100 Hz to 10 kHz. The characteristics of the basis functions are as follows: They have a Lorentzian line shape with a Q-factor of 3 in a frequency segment of $\overline{\omega}_i\pm \overline{\omega}_i/Q$, a very steep gain roll-off of 100 dB/decade on the low frequency side, and a moderate gain roll-off of 40 dB/decade on the high frequency side. The aggressive low frequency attenuation is needed in order to cope with the steep gain profile of the hearing curve between 200 Hz and 1 kHz which corresponds to a slope of 80 dB per decade. To meet the demanding requirements a large set of M=100 resonator transforms is needed for the synthesis of the basis functions. Simulations show that a value of 3 is a good choice for the Q-factor of the resonator transforms. The corresponding resonance frequencies are logarithmically distributed between 100 Hz and 10 kHz in analogy to the basis functions.

Figure 9:
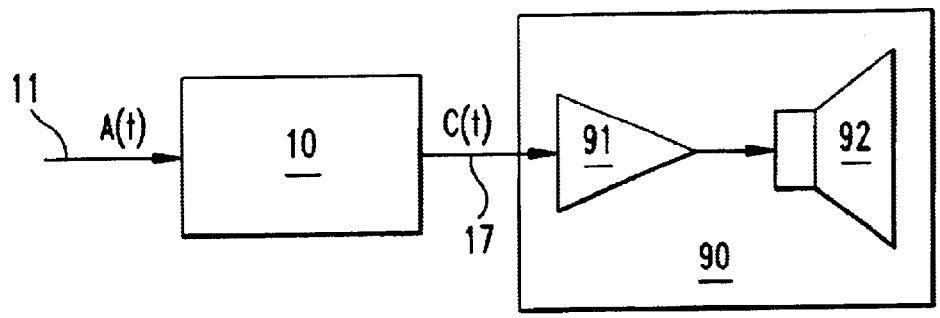
FIG. 9 Is a schematic block diagram of an embodiment of a hearing aid in accordance with the present invention.

There are various ways to couple the hearing aids, as described above, with the human ear. One approach is illustrated in FIG. 9. As shown in this Figure, the hearing aid comprises a signal processing system 91, according to the present invention, which receives an input signal A(t) (e.g., an acoustic signal) via input 92. The signal processing system 91 may comprise a signal processing system 2 or 12, as illustrated in FIGS. 1A and 1B, respectively. The output signal C(t) is fed via output 93 to an interface circuitry 90. This interface circuitry 90 provides an interface between the signal processing system 91 and a human being. In the present embodiment this interface circuitry 90 comprises an amplifier 94 which amplifiers the signal C(t) and a loudspeaker 95. The loudspeaker 95 is designed such that it can be either placed right next to the ear or within the ear. The loudspeaker 95 feeds an acoustic signal into the outer ear.

Figure 10:
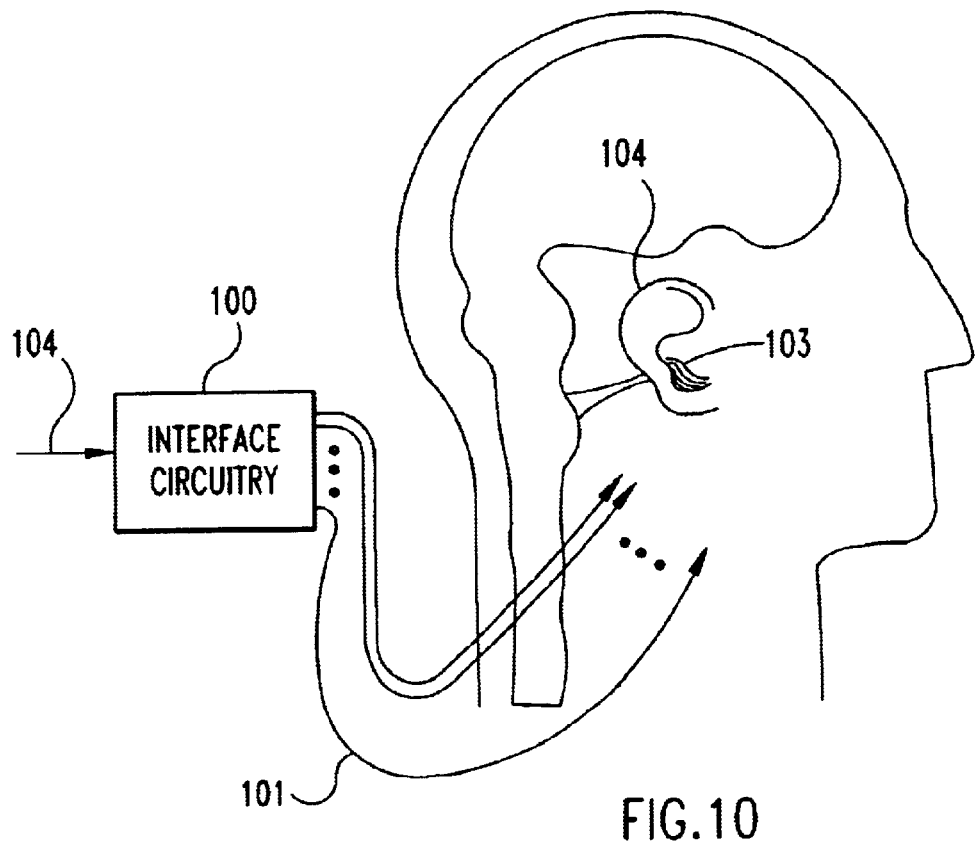
FIG. 10 Is a schematic block diagram of another embodiment of a hearing aid in accordance with the present invention.

Another approach is illustrated in FIG. 10. As shown in this Figure, there is an interface circuitry 100 that interacts directly with the human body. The interface unit 100 receives via input line 102 M output signals $C_1(t), C_2(t), \ldots, C_M(t)$ from a signal processing system according to the present invention (where M∈N). The signal lines 101 can be connected to special implants 102 that are situated in the inner part of the ear. Signals are fed via the signal lines 101 to the implants 103 such that certain segments in the ear 104 are stimulated. The stimulation of the ear by means of implants 103 is used if a person is deaf or partially deaf. Nowadays, in certain cases electrodes are even implanted into the inner ear directly contacting the nerves of the ear. In this case, the interface circuitry 100 has to be adopted such that the signals on signal lines 101 are suited to stimulate the nerves directly. For this purpose, the interface circuitry 100 may comprise a processor which processes the input signal C(t) so as to generate electrical pulses which can be directly fed to the implanted electrodes. The present invention helps to improve current hearing aids because it provides a more reliable and more natural way to process input signals.

The interface circuitry may also be used to connect signal processing systems according to the present invention to a back end system, such as computer, telephone system, hearing aid, speech recognition system, speaker recognition system, or a pervasive computing device, for example. The interface circuitry can be realized by means of discrete elements, or it can be integrated into a chip. The interface circuitry may comprise a microprocessor, multiplexers/demultiplexers, parallel-to-serial converters, serial-to-parallel converters, analog/digital conversion circuits, memory, and so forth.

In the present embodiment of the hearing aid, the orthogonal basis function approach is numerically less efficient than the direct resonator transform method even though no iterative algorithms are involved. However, in applications with relaxed attenuation requirements the basis functions can be synthesized with an accordingly smaller number of resonator transforms, making the orthogonal basis function method eventually the preferred embodiment.

The present signal processing systems can also be used as part of speech recognition systems. These speech recognition systems are used to simplify input of commands or text into computer systems, for example. Also handicapped persons relay more and more on technical and electrical apparatus which can be operated by giving acoustic commands. Furthermore, pilots, car- or truck-drivers, technicians, and surgeons will use the powerful and reliable speech recognition systems enabled by the present invention.

A speech recognition system according to the present invention relies to a certain extent on a set of descriptors (termed cues) output by the inventive signal processing system. This signal processing system is employed as front end that transforms a voice signal (input signal A(t)) into the set of descriptors. This set of descriptors describes certain characteristic properties of the voice signal (input signal A(t)). The set of descriptors can be compared with information stored in a knowledge database or a training database. If a matching set of descriptors of found in the database, then the corresponding, vowel, consonant, syllable, or word might be returned for further processing. The database of such a speech recognition system can be much smaller than the one of known systems.

The present signal processing systems is well suited for use in speaker recognition systems. A speaker recognition system is a system which is used to identify a speaker by its voice. This is important for systems where some identification of the user is required. Examples are access systems, automated teller machines, and the like.

There is also a demand for acoustic detectors which are designed to detect a particular noise or sound. Such a detector could for example be used to indicate whether an engine is about to be destroyed, or to detect acoustic signals which can otherwise not be detected by the human ear. In noisy environment, e.g. in a cockpit, it would be useful to reduce or eliminate noise so as to ensure that voice and other signals can be better understood. Such a detector has to be able to process noise input A(t) in order to generate an output signal C(t) which is fed to a loudspeaker for the suppression of the noise input. For this purpose, the output signal C(t) has to be phase-shifted before it is fed to the loudspeaker. The superposition of the output signal C(t) and the noise input A(t) leads to a reduction in the overall noise. The present invention is well suited for such systems, because it can be designed or adjusted to process and suppress special noise, such as the noise from tires, for example.

Figure 11:
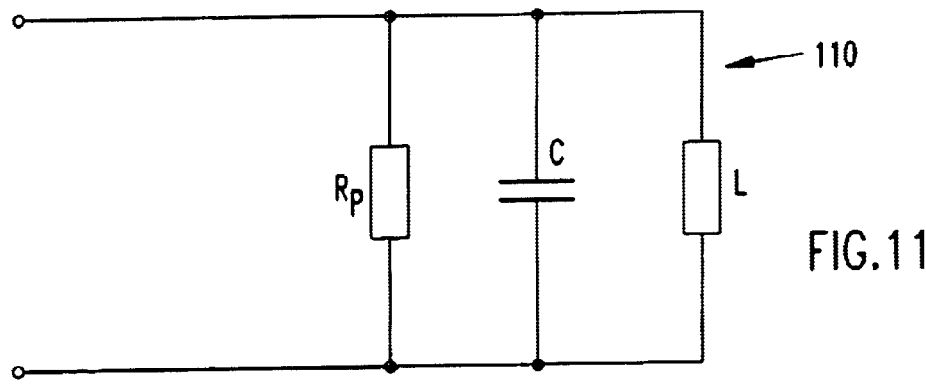
FIG. 11 Is a schematic example of a general resonator in accordance with the present invention.

Another damped electric resonator 110 is shown in FIG. 11. This resonator 110 comprise a resistor $R_2$, a capacitor C, and a coil L. The resonance frequency of this damped resonator 110 is:

$$\varpi = \varpi_0 \sqrt{1 - \frac{1}{4Q^2}}, \tag{10}$$

where $\omega_0$ is the resonance frequency without damping, and the Q-factor is $$Q = R_P \sqrt{\frac{C}{L}}. \tag{11}$$

Figure 12:
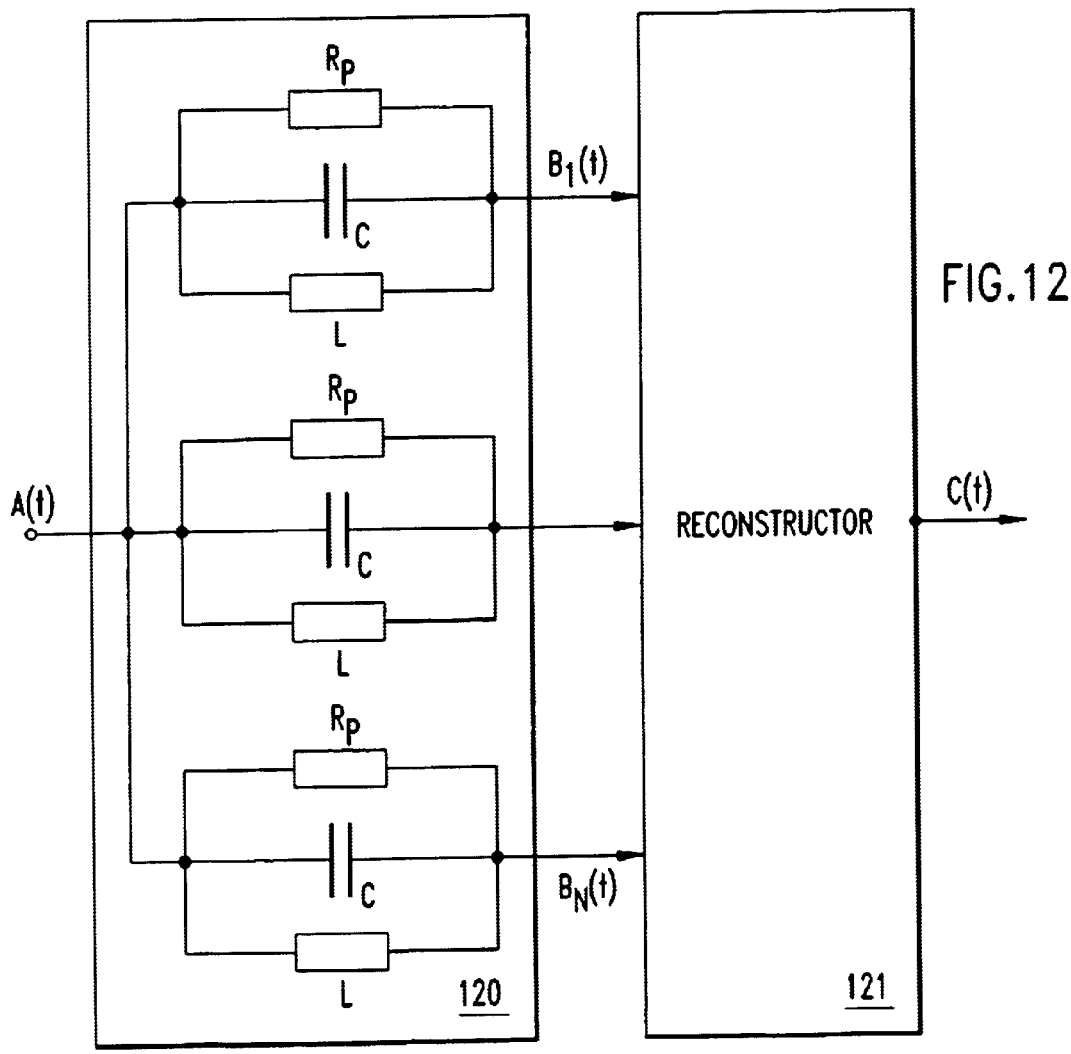
FIG. 12 Is a schematic embodiment, in accordance with the present invention comprising a resonator array with a plurality of resonators as shown in FIG. 11.

One can use N such resonators 110 to build a resonator array 120, as schematically illustrated in FIG. 12. Preferably, each resonator of the resonator array 102 has a different Q-factor and resonance frequency. In FIG. 12 there are N individual output signals $B_1(t), B_2(t), \ldots, B_N(t)$. Each of these N individual output signals $B_1(t), B_2(t), \ldots, B_N(t)$ is then forwarded to a reconstructor 121. This reconstructor provides for the weighting and superposition of the signals such that M output signals C(t) are obtained.

As mentioned farther above, the present scheme can be used for the processing of any kind of signals. If a signal processing system according to the present invention is designed to operate on electrical signals and if an acoustic signal is received, then some sort of microphone of other means for transformation of the acoustic signal into an electrical signal format is required. A microphone is an electroacoustic transducer which converts variations in sound pressure into an equivalent electrical signal, which then is fed to the signal processing system. Any microphone is well suited for use in connection with signal processing system according to the present invention.

The present invention can be realized in hardware, software, or a combination of hardware and software. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

A computer program or computer program means in the present context any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A signal processing system for processing an input signal, comprising:
   a plurality of resonators, each resonator having parameters characterizing it, for processing the input signal to generate N individual output signals; and
   a reconstructor
      for weighting each of the N individual output signals using a corresponding weight to generate N individual weighted signals; and
      for superposing the N individual weighted signals to obtain M output signals;
   whereby N∈N and M∈N, where N is the set of positive integers, and whereby one of the parameters or the weight is time dependent,
   wherein one of the N resonators is a Lorentzian resonator.

2. The signal processing system of claim 1, wherein the input signal is a voice signal.

3. The signal processing system of claim 1, wherein one or more of the plurality of resonators are Lorentzian resonators, and wherein the N individual output signals are fed to a mixing matrix for coupling of these N individual output signals.

4. The signal processing system of claim 1, wherein the plurality of resonators form a dynamic filter array.

5. The signal processing system of claim 1, wherein one of the plurality of resonators is realized by a combination of a processor and a code that embodies an algorithm for execution by the processor.

6. The signal processing system of claim 1, wherein the reconstructor comprises circuitry for dynamically calculating the corresponding weights used for weighting each of the N individual output signals.

7. The signal processing system of claim 1, wherein the reconstructor superposes the N individual weighted signals by a mathematical operation selected from a set of operations consisting of addition, subtraction, multiplication, and division.

8. The signal processing system of claim 1, wherein the plurality of resonators and the reconstructor are realized in a computer system comprising a processor and a code that when executed by the processor generates the M output signals.

9. The signal processing system of claim 8, wherein the code embodies an algorithm for generating a descriptor set for use in a speech recognition system or speaker recognition system.

10. The signal processing system of claim 1, wherein the M output signals represent a set of descriptors which describe properties of the input signal.

11. The signal processing system of claim 10, wherein the set of descriptors is usable by a speech recognition system or speaker recognition system.

12. A signal processing system for processing an input signal, comprising:
   a plurality of resonators, each resonator having parameters characterizing it, for processing the input signal to generate N individual output signals; and
   a reconstructor
      for weighting each of the N individual output signals using a corresponding weight to generate N individual weighted signals; and
      for superposing the N individual weighted signals to obtain M output signals; whereby M∈N and M∈N, where N is the set of positive integers, and whereby one of the parameters or the weight is time dependent,
   wherein one of the plurality of resonators comprises a coil, a resistor, and a capacitor.

13. A signal processing system for processing an input signal, comprising:
   a plurality of resonators, each resonator having parameters characterizing it, for processing the input signal to generate N individual output signals; and
   a reconstructor
      for weighting each of the N individual output signals using a corresponding weight to generate N individual weighted signals; and
      for superposing the N individual weighted signals to obtain M output signals; whereby N∈N and M∈N, where N is the set of positive integers, and whereby one of the parameters or the weight is time dependent wherein one of the plurality of resonators comprises a micromechanical element, preferably a cantilever.

14. A signal processing system for processing an input signal, comprising:
   a plurality of resonators, each resonator having parameters characterizing it, for processing the input signal to generate N individual output signals; and
   a reconstructor
      for weighting each of the N individual output signals using a corresponding weight to generate N individual weighted signals; and
      for superposing the N individual weighted signals to obtain M output signals; whereby N∈M and M∈N, where N is the set of positive integers, and
   whereby one of the parameters or the weight is time dependent, wherein the weight is time dependent and frequency dependent.

15. The signal processing system of claim 14 superposes the N individual weighted signals by a mathematical operation selected from a set of operations consisting of addition, subtraction, multiplication, and division.

16. A signal processing system for processing an input signal, comprising:
   a plurality of resonators, each resonator having parameters characterizing it, for processing the input signal to generate N individual output signals; and
   a reconstructor
      for weighting each of the N individual output signals using a corresponding weight to generate N individual weighted signals; and
      for superposing the N individual weighted signals to obtain M output signals; whereby N∈N and M∈N, where N is the set of positive integers, and whereby one of the parameters or the weight is time dependent and;
   an interface circuitry serving as interface to a back end system, wherein the interface circuitry comprises an amplifier and loudspeaker.

17. The signal processing system of claim 16, wherein the back end system is a hearing aid, or a speech recognition system, or a speaker recognition system, or a pervasive computing device, or a computer system.

18. A method for a signal processing system to process at least one input signal, comprising the steps of:
processing the input signal to generate N individual output signals;
weighting each of the N individual output signals using a corresponding weight to generate N individual weighted signals;
superposing the N individual weighted signals to obtain M output signals; whereby N$\in$N and M$\in$N, where N is the set of positive integers, and whereby one of the parameters or the weight is time dependent and the weight is time dependent and frequency dependent.

19. A signal processing system for processing an input signal, comprising:
a plurality of resonators, each resonator having parameters characterizing it, for processing the input signal to generate N individual output signals; and
a reconstructor
for weighting each of the N individual output signals using a corresponding weight to generate N individual weighted signals; and
for superposing the N individual weighted signals to obtain M output signals; whereby N$\in$M and M$\in$N, where N is the set of positive integers, and whereby one of the parameters or the weight is time dependent, wherein the N individual weighted signals identify different vowels and/or classes of consonants.

20. A method for a signal processing system to process at least one input signal, comprising the steps of:
processing the input signal to generate N individual output signals; and
weighting each of the N individual output signals using a corresponding weight to generate N individual weighted signals; and
superposing the N individual weighted signals to obtain M output signals; whereby N$\in$N and M$\in$N, where N is the set of positive integers, and whereby one of the parameters or the weight is time dependent and, wherein there is more than one input signal.

21. A signal processing system for processing an input signal, comprising:
a plurality of resonators, each resonator having parameters characterizing it, for processing the input signal to generate n individual output signals; and
a reconstructor
for weighting each of the N individual output signals using a corresponding weight to generate N individual weighted signals; and
for superposing the N individual weighted signals to obtain M output signals; whereby N$\in$N and M$\in$N, where N is the set of positive integers, and whereby one of the parameters or the weight is time dependent,
wherein one of the plurality of resonators is realized by a combination of a processor and a code that embodies an algorithm for execution by the processor and wherein the algorithm represents a differential equation, preferably a second order equation.

22. A signal processing system for processing an input signal, comprising:
a plurality of resonators, each resonator having parameters characterizing it, for processing the input signal to generate N individual output signals; and
a reconstructor
for weighting each of the N individual output signals using a corresponding weight to generate N individual weighted signals; and
for superposing the N individual weighted signals to obtain M output signals; whereby N$\in$M and M$\in$N, where N is the set of positive integers, and whereby one of the parameters or the weight is time dependent
and, herein there is more than one input signal.

23. A signal processing system for processing an input signal, comprising:
a plurality of resonators, each resonator having parameters characterizing it, for processing the input signal to generate N individual output signals; and
a reconstructor
for weighting each of the N individual output signals using a corresponding weight to generate N individual weighted signals; and
for superposing the N individual weighted signals to obtain M output signals; whereby N$\in$M and M$\in$N, where N is the set of positive integers, and whereby one of the parameters or the weight is time dependent,
further comprising means for receiving L time signals which either make the parameters or the weights time dependent and wherein <$\in$N.

24. The signal processing system of claim 23, wherein the L time signals are provided by a resonator, a reconstructor, or a computer.

25. Method for processing an input signal, comprising the steps:
processing the input signal by means of a plurality of resonators, each resonator having parameters characterizing it, to generate N individual output signals;
weighting each of the N individual output signals using a corresponding weight to generate N individual weighted signals;
superposing the N individual weighted signals to obtain M output signals;
whereby N$\in$N and M$\in$N, where N is the set of positive integers, and
receiving L time signals which either make the parameters or the weights time dependent and wherein L$\in$N whereby one of the parameters or the corresponding weight is time dependent.

26. A computer program element comprising:
computer program code means to make a computer system execute procedure for the processing of an input signal by:
processing the input signal to generate N individual output signals;
weighting each of the N individual output signals using a corresponding weight to generate N individual weighted signals; and
superposing the N individual weighted signals to obtain M output signals;
whereby N$\in$N and M$\in$N, where N is the set of positive integers, and
receiving L time signals which either make the parameters or the weights time dependent and wherein L$\in$N.

27. A computer program product for the processing of an input signal, said computer program product comprising a computer readable medium, having thereon:
- computer program code means, when said program is loaded, to make a computer system, execute procedure to:
- process the input signal to generate N individual output signals;
- weigh each of the N individual output signals using a corresponding weight to generate N individual weighted signals; and
- superpose the N individual weighted signals to obtain M output signals;
- whereby N∈N and M∈N, where N is the set of positive integers, and
- receiving L time signals which either make the parameters or the weights time dependent and wherein L∈N.

28. A method for a signal processing system to process at least one input signal, comprising the steps of:
- processing the input signal using a plurality of resonators to generate N individual output signals;
- weighting each of the N individual output signals using a corresponding weight to generate N individual weighted signals; and
- superposing the N individual weighted signals to obtain M output signals; whereby N∈N and M∈N, where N is the set of positive integers, and whereby one of the parameters or the weight is time dependent
- wherein one of the plurality of resonators is realized by a combination of a processor and a code that embodies an algorithm for execution by the processor and wherein the algorithm represents a differential equation, preferably a second order equation.

* * * * *